US012746847B2

(12) United States Patent
Alberts et al.

(10) Patent No.: US 12,746,847 B2

(45) Date of Patent: Sep. 29, 2026

(54) APPARATUS AND METHOD FOR PREDICTING AND AVOIDING DEGRADATION OF ELECTRICAL DRIVE COMPONENTS IN A VEHICLE

(71) Applicant: Bayerische Motoren Werke Aktiengesellschaft, Munich (DE)

(72) Inventors: Esther Alberts, Munich (DE); Marcel Ewers, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 585 days.

(21) Appl. No.: 18/550,585

(22) PCT Filed: Feb. 1, 2022

(86) PCT No.: PCT/EP2022/052363
§ 371 (c)(1),
(2) Date: Sep. 14, 2023

(87) PCT Pub. No.: WO2022/194437
PCT Pub. Date: Sep. 22, 2022

(65) Prior Publication Data

US 2024/0294094 A1 Sep. 5, 2024

(30) Foreign Application Priority Data

Mar. 15, 2021 (DE) ..................... 10 2021 106 190.3

(51) Int. Cl.
*B60L 58/16* (2019.01)
*B60L 3/00* (2019.01)

(52) U.S. Cl.
CPC ............. *B60L 58/16* (2019.02); *B60L 3/0046* (2013.01); *B60L 2240/12* (2013.01);
(Continued)

(58) Field of Classification Search
CPC .... B60L 58/16; B60L 3/0046; B60L 2240/12; B60L 2240/64; B60L 2250/18;
(Continued)

(56) References Cited

U.S. PATENT DOCUMENTS

| | | | |
|---|---|---|---|
| 11,685,284 | B2 | 6/2023 | Rechkemmer et al. |
| 2013/0085696 | A1 | 4/2013 | Xu et al. |
| 2016/0137185 | A1 | 5/2016 | Morisaki |
| 2022/0166042 | A1 | 5/2022 | Braun et al. |

FOREIGN PATENT DOCUMENTS

| | | | | |
|---|---|---|---|---|
| CN | 104459553 | A | * | 3/2015 |
| DE | 10 2016 211 898 | A1 | | 1/2018 |
| DE | 10 2016 218 555 | A1 | | 3/2018 |
| DE | 10 2019 200 949 | A1 | | 7/2020 |
| DE | 11 2018 007 469 | T5 | | 12/2020 |
| EP | 2 989 436 | B1 | | 3/2016 |

OTHER PUBLICATIONS

PCT/EP2022/052363, International Search Report dated Jun. 15, 2022 (Three (3) pages).

(Continued)

*Primary Examiner* — Daniel Cavallari
(74) *Attorney, Agent, or Firm* — Crowell & Moring LLP

(57) ABSTRACT

A system and method for predicting and avoiding degradation of an electrical drive component in a vehicle. A determination unit determines road attributes of a planned route of the vehicle. A prediction unit continuously predicts a type of degradation of an electrical drive component in the vehicle with respect to the determined road attributes. In response to the prediction unit predicting the type of degradation of the drive component, a control unit anticipatorily controls the drive component such that the predicted type of degradation of the drive component does not occur.

8 Claims, 4 Drawing Sheets

(52) U.S. Cl.
CPC ....... *B60L 2240/64* (2013.01); *B60L 2250/18* (2013.01); *B60L 2260/50* (2013.01)

(58) Field of Classification Search
CPC .... B60L 2260/50; B60L 3/12; B60L 2240/36; B60L 2240/622; B60L 2240/642; B60L 3/0069; B60L 2240/525; B60L 2240/625; B60L 2240/627; B60L 2240/645; B60L 2240/647; B60L 2240/70; B60L 2250/12; B60L 2260/44; B60L 3/003; B60L 3/0084; B60L 3/04; B60L 3/06; B60L 2240/425; B60L 2240/68; B60L 2260/46; B60L 3/0061; B60L 58/14; B60L 58/15; B60L 2240/545; H02J 7/61; H02J 7/1446; H02J 7/62; H02J 7/65; H02J 2105/37; B60W 30/184; B60W 2520/10; B60W 2555/60; B60W 2510/087; B60W 2540/30; B60W 2552/05; B60W 2552/15; B60W 2552/30; H01M 10/425; H01M 10/48; H01M 10/486; H01M 2010/4271; H01M 2220/20; Y02T 10/64; Y02T 10/70; Y02T 10/72; Y02T 90/16
See application file for complete search history.

(56) References Cited

OTHER PUBLICATIONS

German-language German Office Action issued in German application No. 10 2021 106 190.3 dated Sep. 3, 2021 (Five (5) pages).
"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (Two (2) pages).
"(R) Taxonomy and Definitions for Terms Related to Driving Automation Systems for On-Road Motor Vehicles", Surface Vehicle Recommended Practice, SAE (Society of Automotive Engineering) International, J3016™M, Sep. 2016, pp. 1-30 (30 pages).
Korean-language Office Action issued in Korean Application No. 10-2023-7022562 dated Dec. 31, 2024 with English translation (9 pages).
Korean-language Office Action issued in Korean Application No. 10-2023-7022562 dated Jul. 24, 2025 with English translation (8 pages).
Baum, M. et al., "Energy-Optimal Routes for Electric Vehicles", Karlsruhe Institute of Technology (KIT), 2013, pp. 1-15 (15 pages).

* cited by examiner

APPARATUS AND METHOD FOR PREDICTING AND AVOIDING DEGRADATION OF ELECTRICAL DRIVE COMPONENTS IN A VEHICLE

This application is a 371 of International Application No. PCT/EP2022/052363, filed Feb. 1, 2022 which claims priority under 35 U.S.C. § 119 from German Patent Application No. 10 2021 106 190.3, filed Mar. 15, 2021, the entire disclosure of which is herein expressly incorporated by reference.

BACKGROUND AND SUMMARY OF THE INVENTION

The present invention relates to a method for predicting and avoiding the degradation of electrical drive components in a vehicle.

Degradation of system components in a vehicle involves the intentional downrating of critical system properties, for example the capacity of a system component, in order to protect system components, for example for the protection of a system component against overheating associated with an overload. With respect to an overload of the respective system component, degradation occurs where a corresponding threshold value, for example a temperature threshold value, is exceeded. Each system component is considered separately, and degradation is initiated upon the achievement of a maximum loading index, for example upon the achievement of a maximum temperature or a maximum temperature value for the system component. This means that the loading index of each individual electrical drive component is considered as a measure of the current overall loading of electrical drive components. This is disadvantageous, in that any degradation of electrical drive components is generally associated with a severe restriction of the respective drive component, which thus impacts strongly upon the overall drive capacity of the vehicle. This is clearly perceptible to a driver of the vehicle, and can result in restrictions of driving capability in road traffic.

The object of the invention is the provision of a solution which permits the prediction and avoidance of the degradation of one or more electrical drive components in a vehicle.

According to the invention, this object is fulfilled by the independent claims. Preferred embodiments are the subject matter of the dependent claims.

The above-mentioned object is fulfilled by a system for predicting and avoiding degradation of electrical drive components in a vehicle, comprising the following: a determination unit, which is designed to determine road attributes of a planned route of the vehicle; a prediction unit, which is designed to continuously predict a type of degradation of an electrical drive component in the vehicle, with respect to the road attributes thus determined; and a control unit which is designed, when the type of degradation of the drive component is predicted by the prediction unit, to control the drive component such that the drive component is influenced in an anticipatory manner, such that the predicted type of degradation of the drive component does not occur. To this end, measures can be implemented, including, for example, a reduction of a cooling threshold of the drive component, such that the predicted type of degradation is precluded.

In the context of the present document, the term "vehicle" includes mobile means of transport, which are employed for the conveyance of persons (passenger traffic), goods (goods traffic) or equipment (machines or auxiliary equipment). In particular, the term "vehicle" encompasses motor vehicles, including motor vehicles which can be at least partially electrically powered (electric cars, hybrid vehicles).

The vehicle can be controlled by a vehicle driver. Additionally or alternatively, the vehicle can be an at least partially automatically driven vehicle. In the context of the present document, the term "automatically driven vehicle" or "automated driving" can be understood as driving with automated longitudinal or lateral steering, or as autonomous driving with automated longitudinal and lateral steering. Automated driving can involve, for example, long-term driving on a motorway, or short-term driving in the context of parking or maneuvering. The term "automated driving" includes automated driving with an arbitrary degree of automation. Exemplary degrees of automation are assisted, partially-automated, highly-automated or fully-automated driving. These degrees of automation have been defined by the Federal Road Traffic Authority ("Bundesanstalt für Straßenwesen" or "BASt") (see BASt publication: "Research abstracts", November 2012 edition). In assisted driving, the driver is continuously responsible for longitudinal or lateral steering, whereas the system can respectively assume other functions, within specific limits. In partially-automated driving, the system assumes longitudinal and lateral steering for a specific time period and/or in specific situations, wherein the driver, as per assisted driving, is required to monitor the system on a continuous basis. In highly-automated driving, the system assumes longitudinal and lateral steering for a specific time period, without the necessity for continuous monitoring of the system by the driver; however, the driver must be capable of resuming control of the vehicle within a certain time. In fully-automated driving, for a specific application, the system is capable of assuming the automatic control of driving in all situations; in this application, a driver is no longer required. The four above-mentioned degrees of automation correspond to SAE levels 1 to 4, as per SAE standard J3016 (SAE: Society of Automotive Engineering). SAE J3016 further provides for SAE level 5, as the highest level of automation, which is not included in the BASt definition. SAE level 5 corresponds to driverless driving, wherein the system is capable of the automatic management of all situations throughout the entire journey, in the same way as a human driver.

The system comprises a determination unit, which is designed to determine road attributes of a planned route of the vehicle. The planned route can comprise a route which is input or communicated by means of a navigation system of the vehicle. Additionally or alternatively, the planned route can be a route which is learned by a computing unit of the vehicle, which can be determined by the computing unit, for example from a motion profile of a user of the vehicle, by the employment of appropriate algorithms ("learned navigation"). The system further comprises a prediction unit, which is designed to continuously predict a type of degradation of an electrical drive component in the vehicle, with respect to the road attributes thus determined. The system further comprises a control unit, which is designed, when the type of degradation of the drive component is predicted by the prediction unit, to control the drive component such that the drive component is influenced in an anticipatory manner, such that the predicted type of degradation of the drive component does not occur.

Advantageously, by means of an anticipatory influence of the drive component, the predicted degradation of the drive component is prevented. The performance capability of the overall vehicle system is maintained accordingly.

The electrical drive component preferably comprises: a high-voltage store of the vehicle, wherein the predicted type of degradation of the high-voltage store comprises the following: degradation associated with an overshoot or undershoot of a predefined critical temperature or of a predefined critical temperature value of the high-voltage store; and/or degradation associated with an overshoot or undershoot of predefined critical state-of-charge of the high-voltage store; and/or degradation associated with an overshoot or undershoot of a further appropriate and predefined operating status variable of the high-voltage store; and/or an electrical machine, or e-machine, of the vehicle, wherein the predicted type of degradation of the e-machine comprises a degradation associated with the overshoot or undershoot of a predefined critical temperature or of a predefined critical temperature value of a component of the e-machine; and/or drive electronics of the vehicle, wherein the predicted type of degradation of drive electronics comprises a degradation associated with the overshoot or undershoot of a predefined critical temperature or of a predefined critical temperature value of the drive electronics; and/or a high-voltage cable harness of the vehicle, wherein the predicted type of degradation of the high-voltage cable harness comprises a degradation associated with the overshoot or undershoot of a predefined critical temperature or of a predefined critical temperature value of the high-voltage cable harness; and/or a further electrical drive component of the vehicle, wherein the predicted type of degradation of the further electrical drive component comprises a degradation associated with the overshoot or undershoot of an appropriate and predefined critical operating status variable of the latter.

The electrical drive component can comprise a high-voltage store of the vehicle. The predicted type of degradation of the high-voltage store can be a predicted degradation of the high-voltage store associated with a functionally critical overshoot and/or undershoot of a predefinable or predefined temperature (or temperature value) of the high-voltage store. Additionally or alternatively, the predicted type of degradation of the high-voltage store can comprise an overshoot or undershoot of a predefinable or predefined state-of-charge of the high-voltage store. Moreover, the predicted type of degradation can comprise a degradation associated with an overshoot or undershoot of a further appropriate and predefined critical operating status variable of the high-voltage store.

Additionally or alternatively, the electrical drive component can comprise an electrical machine, or e-machine, of the vehicle. The predicted type of degradation of the e-machine can comprise a degradation associated with an overshoot or undershoot of a predefinable or predefined temperature of a component of the e-machine. A component of the e-machine can be, for example, a stator, a rotor, a transmission and/or power electronics of the e-machine.

Additionally or alternatively, the electrical drive component can comprise drive electronics of the vehicle. The predicted type of degradation of the drive electronics can comprise an overshoot or undershoot of a predefinable or predefined critical temperature of drive electronics.

Additionally or alternatively, the electrical drive component can comprise a high-voltage cable harness of the vehicle. The predicted type of degradation of the high-voltage cable harness can comprise an overshoot or undershoot of a predefinable or predefined temperature of the high-voltage cable harness.

Additionally or alternatively, the electrical drive component can comprise any further electrical drive component of the vehicle. The type of degradation of any further drive component can comprise a degradation associated with an overshoot or undershoot of an appropriate and predefined critical operating status variable of the latter.

Continuous prediction of the type of degradation of the electrical drive component by the prediction unit preferably comprises the following: categorization of the planned route by reference to road attributes, wherein road attributes comprise: a rising gradient along the route, an anticipated speed of the vehicle along the route, a road type, a road surface, applicable speed limits along the route, a curvature of the route, and/or current impairments along the route; division of the route into sections for each road attribute; and prediction of a degradation of the electrical drive component of the vehicle for each road attribute.

Continuous prediction of the type of degradation of the electrical drive component by the prediction unit can comprise the following: categorization of the planned route by reference to road attributes, wherein road attributes comprise: a rising gradient along the route, an anticipated speed of the vehicle along the route, a road type, a road surface, applicable speed limits along the route, a curvature of the route, and/or current impairments along the route; division of the route into sections for each road attribute; and prediction of a degradation of the electrical drive component of the vehicle for each road attribute.

For the determination of road attributes, the determination unit can employ navigation data or route data. These can be saved locally in the vehicle, for example in a navigation unit of the vehicle. Additionally or alternatively, route data can be sourced from a backend, for example via a cellular network. To this end, the vehicle can comprise a communication unit which is designed to set up a communication link with other communication subscribers, for example with the backend. The communication unit can comprise a subscriber identity module or SIM card, the function of which is the set-up of a communication link via a cellular network. The subscriber identity module unambiguously identifies the communication unit in the cellular network. The communication link can be a data link (e.g. for packet switching) and/or a hard-wired communication link (e.g. for line switching). Communication can be executed in accordance with the cellular vehicle-to-X (C-V2X) paradigm, as per LTE Standard Version 14. Moreover, the communication unit, independently of the cellular network or the availability of sufficient capacities on the currently accessible cellular network, can communicate via another air interface, for example a WLAN. To this end, IST-G5 or IEEE 802.11p can be employed for vehicle-to-vehicle (V2V) communication. The vehicle can comprise a navigation module, which is designed to detect current positional data for the vehicle. For the detection or determination of a geographical location, the navigation unit can determine or detect current positional data by means of a navigation satellite system. The navigation satellite system can be any current or future Global Navigation Satellite System (GNSS) for positional identification and navigation by the reception of signals from navigation satellites and/or pseudolites. These can include, for example, the Global Positioning System (GPS), the GLObal Navigation Satellite System (GLONASS), the Galileo positioning system and/or the BeiDou Navigation Satellite System. In the exemplary case of GPS, the navigation module can comprise a GPS module, which is designed to determine current GPS positional data for the vehicle.

In the next step, the prediction unit can divide the route into sections for each road attribute. In a next step, the type of degradation of the electrical drive component for each road attribute can be predicted by the prediction unit. This can be executed by means of appropriate machine learning algorithms.

Advantageously, by the prediction of the type of degradation of the electrical drive component in consideration of a plurality of relevant road attributes, a foreseeable degradation of the electrical drive component can be predicted in an accurate manner.

Continuous prediction of the type of degradation by the prediction unit is preferably executed in consideration of a current driving style of a driver of the vehicle.

To this end, for each journey, a current driving style of the driver of the vehicle can be determined by the prediction unit. For example, in advance, a reference value or average value for the driving style of a plurality of drivers of a vehicle fleet can be determined. During the travel of the vehicle along the route, any deviation of the driving style of the driver of the vehicle from the reference value or average value for the vehicle fleet thus determined can be identified. The prediction unit can consider the deviation of the driving style of the driver of the vehicle from the reference value thus determined in the prediction of the type of degradation of the electrical drive component.

Advantageously, in this manner, the accuracy of the prediction of the type of degradation by the prediction unit can thus be enhanced.

According to a second aspect, the fundamental object of the invention is fulfilled by a method for predicting and avoiding degradation of an electrical drive component in a vehicle, comprising the following: determination, by means of a determination unit, of road attributes of a planned route of the vehicle; continuous prediction, by means of a prediction unit, of a type of degradation of an electrical drive component, with reference to the road attributes thus determined; and in response to the type of degradation of the drive component predicted by the prediction unit: control of the drive component by a control unit, such that the drive component is influenced in an anticipatory manner, such that the predicted type of degradation of the drive component does not occur.

The electrical drive component preferably comprises the following: a high-voltage store of the vehicle, wherein the predicted type of degradation of the high-voltage store comprises the following: degradation associated with an overshoot or undershoot of a predefined critical temperature or of a predefined critical temperature value of the high-voltage store; and/or degradation associated with an overshoot or undershoot of predefined critical state-of-charge of the high-voltage store; and/or degradation associated with an overshoot or undershoot of a further appropriate and predefined operating status variable of the high-voltage store; and/or an electrical machine, or e-machine, of the vehicle, wherein the predicted type of degradation of the e-machine comprises a degradation associated with the overshoot or undershoot of a predefined critical temperature or of a predefined critical temperature value of a component of the e-machine; and/or drive electronics of the vehicle, wherein the predicted type of degradation of drive electronics comprises a degradation associated with the overshoot or undershoot of a predefined critical temperature of the drive electronics; and/or a high-voltage cable harness of the vehicle, wherein the predicted type of degradation of the high-voltage cable harness comprises a degradation associated with the overshoot or undershoot of a predefined critical temperature of the high-voltage cable harness; and/or a further electrical drive component of the vehicle, wherein the predicted type of degradation of the further electrical drive component comprises a degradation associated with the overshoot or undershoot of an appropriate and predefined critical operating status variable of the latter.

Continuous prediction of the type of degradation preferably comprises the following: categorization of the planned route by reference to road attributes, wherein road attributes comprise: a rising gradient along the route, an anticipated speed of the vehicle along the route, a road type, a road surface, applicable speed limits along the route, a curvature of the route, and/or current impairments along the route; division of the route into sections for each road attribute; and prediction of a degradation of the electrical drive component of the vehicle for each road attribute.

Continuous prediction of the type of degradation is preferably executed in consideration of a current driving style of a driver of the vehicle.

These and further functions, features and advantages of the present invention will be clarified by an examination of the following detailed description of preferred exemplary embodiments and the attached figures. It is evident that—although embodiments are described separately—individual features thereof can be combined to form further embodiments.

DETAILED DESCRIPTION OF THE DRAWINGS

Figure 1:
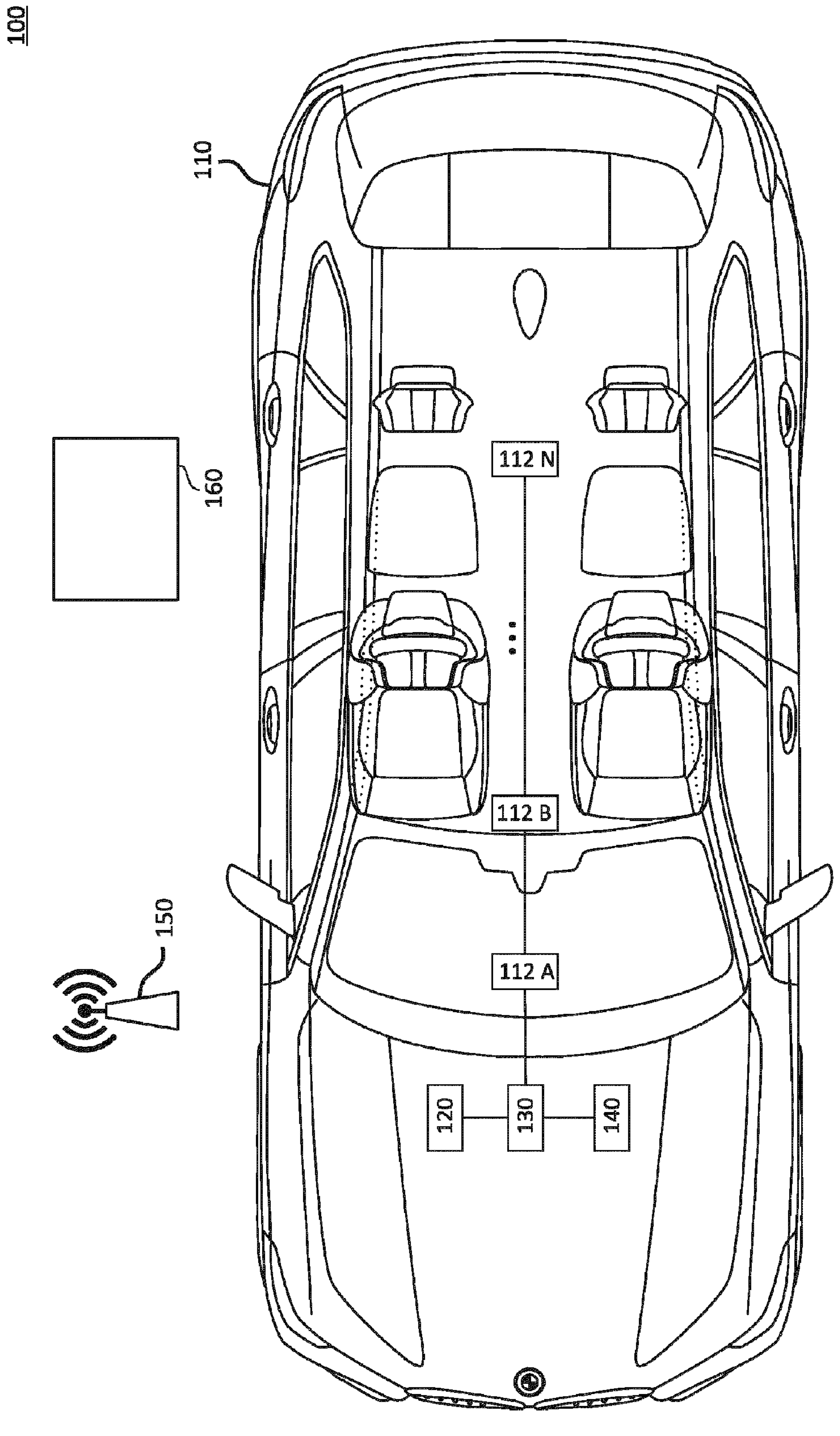
FIG. 1 shows a schematic representation of a system for predicting and avoiding degradation of an electrical drive component in a vehicle.

FIG. 1 shows a schematic representation of a system 100 for predicting and avoiding degradation of an electrical drive component 112 A, 112 B . . . 112 N in a vehicle 110.

The system 100 comprises a determination unit 120, which is designed to determine road attributes of a planned route of the vehicle 110. Road attributes can comprise the following: a rising gradient along the route; and/or an anticipated speed of the vehicle 110 along the route; and or a road type, wherein the definition of a road type can include classification as a state highway, a motorway, a federal highway, an inner city road, etc.; and/or a road surface along the route; and/or applicable speed limits along the route; and/or a road curvature along the route; and/or current impairments along the route, including e.g. current information on congestion, current roadworks, current accident information, current weather information, etc.; and/or further relevant road attributes which can describe a property of the route.

For the determination of road attributes, the determination unit 120 can employ navigation data or route data. These can be saved locally in the vehicle 110, for example in a navigation unit of the vehicle 110. Additionally or alternatively, navigation data or route data can be sourced from a backend 160, for example via a cellular network 150. To this end, the vehicle 110 can comprise a communication unit which is designed to set up a communication link with other communication subscribers, for example with the backend 160. The communication unit can comprise a subscriber identity module or SIM card, the function of which is the set-up of a communication link via a cellular network 150. The subscriber identity module unambiguously identifies the communication unit in the cellular network 150. The communication link can be a data link (e.g. for packet switching) and/or a hard-wired communication link (e.g. for line switching). Communication can be executed in accordance with the cellular vehicle-to-X (C-V2X) paradigm, as per LTE Standard Version 14. Moreover, the communication unit, independently of the cellular network or the availability of sufficient capacities on the currently accessible cellular network, can communicate via another air interface, for example a WLAN. To this end, IST-G5 or IEEE 802.11p can be employed for vehicle-to-vehicle (V2V) communication. The vehicle 110 can comprise a navigation module, which is designed to detect current positional data for the vehicle 110. For the detection or determination of a geographical location, the navigation module can determine or detect current positional data by means of a navigation satellite system. The navigation satellite system can be any current or future Global Navigation Satellite System (GNSS) for positional identification and navigation by the reception of signals from navigation satellites and/or pseudolites. These can include, for example, the Global Positioning System (GPS), the GLObal Navigation Satellite System (GLONASS), the Galileo positioning system and/or the BeiDou Navigation Satellite System. In the exemplary case of GPS, the navigation module can comprise a GPS module, which is designed to determine current GPS positional data for the vehicle 110. By means of the navigation modules of the vehicle 110, the planned route of the vehicle 110 can be determined.

The system 100 further comprises a prediction unit 130, which is designed to continuously predict a type of degradation of an electrical drive component 112 A, 112 B . . . 112 N in the vehicle 110. The electrical drive component 112 A, 112 B . . . 112 N can comprise a high-voltage store of the vehicle 110. The predicted type of degradation of the high-voltage store can comprise a (predicted) degradation associated with an overshoot or undershoot of a predefined critical temperature of the high-voltage store. Additionally or alternatively, the predicted type of degradation can comprise a (predicted) degradation associated with an overshoot or undershoot of a predefined critical state-of-charge of the high-voltage store. Additionally or alternatively, the predicted type of degradation can comprise a (predicted) degradation associated with an overshoot or undershoot of a further and appropriate predefined critical operating status variable of the high-voltage store.

Additionally or alternatively, the electrical drive component 112 A, 112 B . . . 112 N can comprise an electrical machine, or e-machine, of the vehicle 110. The predicted type of degradation of the e-machine can comprise a (predicted) degradation associated with an overshoot or undershoot of a predefined critical temperature of a component of the e-machine. A component of the e-machine can comprise, for example, a stator, a rotor, a transmission and/or power electronics of the e-machine.

Additionally or alternatively, the electrical drive component 112 A, 112 B . . . 112 N can comprise drive electronics of the vehicle 110. The predicted type of degradation of drive electronics can comprise a (predicted) degradation associated with an overshoot or undershoot of a predefined critical temperature of the drive electronics.

Additionally or alternatively, the electrical drive component 112 A, 112 B . . . 112 N can comprise a high-voltage cable harness of the vehicle 110. The predicted type of degradation of the high-voltage cable harness can comprise a predicted degradation associated with an overshoot or undershoot of a predefined critical temperature of the high-voltage cable harness.

Additionally or alternatively, the electrical drive component 112 A, 112 B . . . 112 N can comprise any further electrical drive component of the vehicle 110, wherein the predicted type of degradation of the further electrical drive component can comprise a (predicted) degradation associated with an overshoot or undershoot of an appropriate and predefined critical operating status variable.

Continuous prediction of the type of degradation by the prediction unit 130 can comprise categorization of the planned route by reference to road attributes. For the categorization of the planned route by reference to the above-mentioned road attributes, the prediction unit 130 can employ navigation data or route data. In the next step, the prediction unit 130 can divide the route into sections for each road attribute. In a next step, the type of degradation of the electrical drive component 112 A, 112 B . . . 112 N for each road attribute can be predicted by the prediction unit 130. This can be executed by means of appropriate machine learning algorithms. Continuous prediction of a type of degradation of the electrical drive component is described in greater detail hereinafter with reference to FIG. 3.

For the continuous prediction of the type of degradation by the prediction unit, an appropriate machine learning algorithm can be employed.

In the training phase of the machine learning algorithm, firstly, a map can be generated which represents how much energy has been consumed by vehicles, for example of a vehicle fleet, per road segment of a route, for example per 100 m of the route. The map can be generated by the consolidation of energy consumption data for the vehicle fleet and/or by the consolidation of speed and acceleration data for the vehicle fleet. Further road attributes, as described above, including e.g. gradients, road categories, etc., can be considered in the determination of energy consumption. In a next step, the machine learning algorithm can be trained, wherein a time series comprised of an energy consumption, a speed, a gradient and a segmental length of the route of the vehicle fleet is employed as an input. As an output, the machine learning algorithm generates a time series of predicted types of degradation of the electrical drive components 112 A, 112 B, . . . 112 N.

In practice, the energy map can be transmitted, for example from a backend 160, to the vehicle 110. The vehicle 110 determines energy consumption along the route. As an input, the machine learning algorithm receives a predicted energy consumption, in consideration of road attributes along the route. As an output, types of degradation of the electrical drive components along the route 112 A, 112 B, . . . 112 N are predicted (see column 1 of table 350 in FIG. 3).

The prediction unit 130, for the prediction of the type of degradation, can consider a current driving style of a driver of the vehicle 110.

To this end, for each journey, a current driving style of the driver of the vehicle 110 can be determined. For example, in advance, a reference value or average value for the driving style of a plurality of drivers of a vehicle fleet can be determined. During the travel of the vehicle along the route, any deviation of the driving style of the driver of the vehicle from the reference value or average value for the vehicle fleet thus determined can be identified. The prediction unit 130 can consider the deviation of the driving style of the driver of the vehicle from the reference value thus determined in the prediction of the type of degradation of the electrical drive component.

The system further comprises a control unit 140, which is designed, in response to the type of degradation predicted by the prediction unit 130, to control the drive component 112 A, 112 B, . . . 112 N such that the drive component 112 A, 112 B, . . . , 112 N is influenced in an anticipatory manner with respect to the predicted type of degradation, such that the predicted type of degradation does not occur, as described in greater detail with reference to FIG. 2.

Advantageously, by means of an anticipatory influence of the drive component 112 A, 112 B, . . . 112 N, the predicted degradation of the drive component 112 A, 112 B, . . . 112 N predicted by the prediction unit 130 is prevented. The performance capability of the overall system of the vehicle 110 is maintained accordingly.

Figure 2:
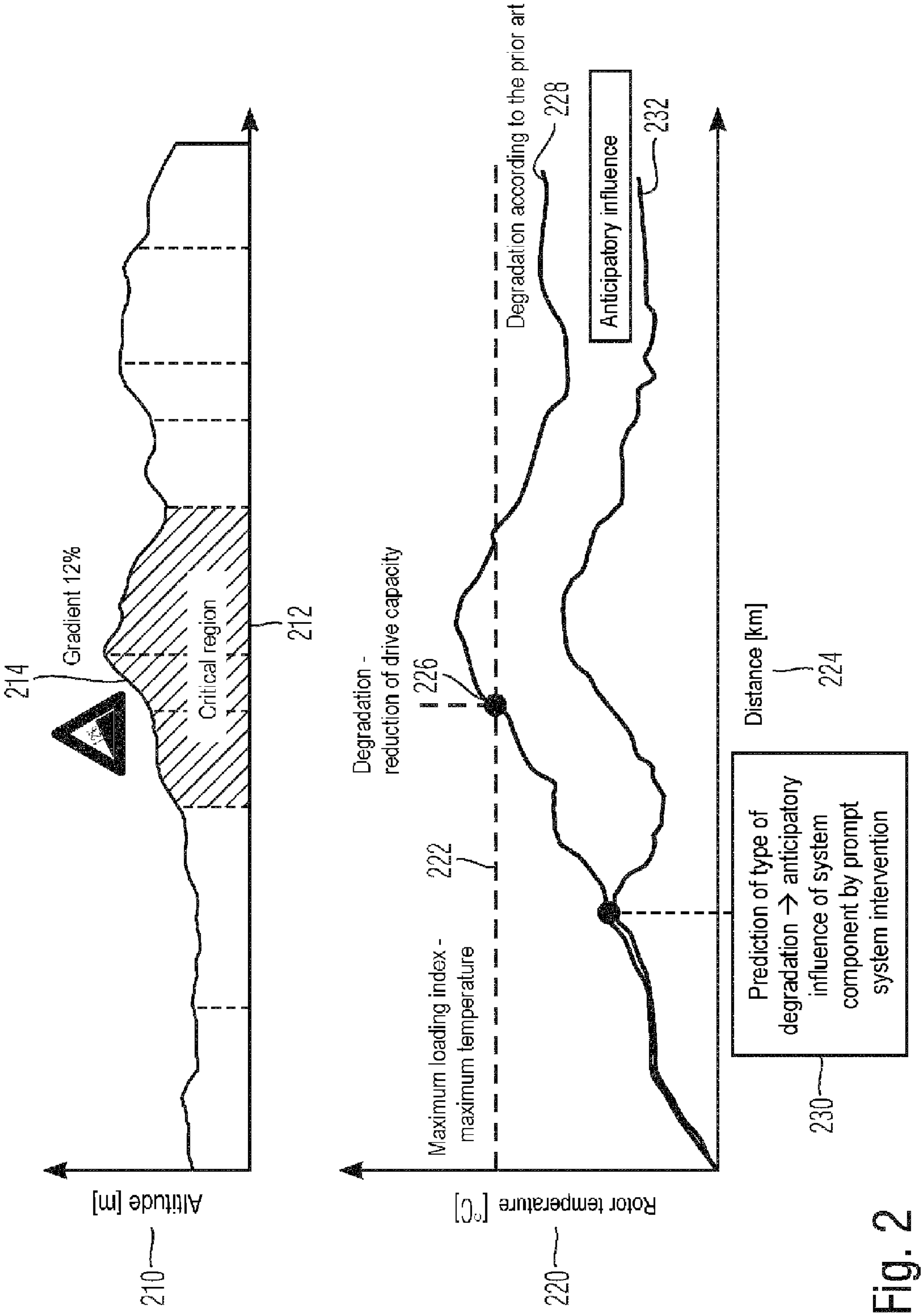
FIG. 2 shows an exemplary influencing of an electrical drive component for the prevention of degradation of the electrical drive component in the vehicle.

FIG. 2 shows an exemplary prevention of the degradation of 228 of an electrical drive component 112 A, 112 B, . . . 112 N in the vehicle 110 by the anticipatory influence of the drive component 112 A, 112 B, . . . 112 N.

The upper diagram, by way of a selected exemplary road attribute, shows an altitude profile along a planned route. The y-axis 210 shows an exemplary altitude in metres, and the x-axis shows the exemplary route 212. In the central region of the route, a critical region 214 can be seen, which incorporates a rising gradient of 12% along the route. In the lower diagram, along the y-axis 220, by way of exemplary loading index, a maximum temperature or maximum temperature value of an exemplary drive component of a rotor is plotted with respect to the rotor temperature. The x-axis 224 shows the exemplary route corresponding to the altitude profile represented in the upper diagram. The maximum loading index of the rotor is the maximum permissible temperature thereof 222, as represented by the broken line. The upper curve 228 represents the temperature characteristic of the rotor associated with degradation, as known from the prior art. Degradation of the rotor thus occurs upon the achievement of the maximum loading index 226 or an overshoot of the maximum temperature or of a maximum temperature value. In other words, the rotor is running hot. By means of an appropriate function, the achievement of the maximum loading index or the overshoot of the maximum or minimum temperature value can be detected or determined. In consequence, the capacity of the e-machine is reduced, in order to prevent any damage to the rotor by the excessively high temperature. This impacts strongly upon the driving capacity of the vehicle 110.

The lower curve 232 represents the temperature characteristic of the rotor along the same route, with the execution of an anticipatory influence upon the electric drive component 112 A, 112 B, . . . 112 N, as described with reference to FIG. 1. At an early time point 230, the prediction unit 130 executes a prediction of the type of degradation (degradation of the e-machine associated with an anticipated overshoot of a maximum temperature value of the rotor), in response to which the control unit 114 controls the e-machine of the vehicle such that the maximum temperature of the rotor is not achieved. For example, early cooling of the rotor, as a component of the e-machine, and thus an exemplary drive component, can be executed. The control unit 114 thus actuates, for example, a cooler or a cooling unit, such that cooling of the rotor or of the e-machine is initiated at time point 230. By means of the anticipatory influence of the electrical drive component, the predicted type of degradation 226 is prevented.

The influence of the electrical drive component 112 A, 112 B, . . . 112 N by the cooling of the electrical drive component 112 A, 112 B, . . . 112 N is an exemplary influence of the latter. Any appropriate influence of the electrical drive component 112 A, 112 B, . . . 112 N for the prevention of the predicted type of degradation can be employed or executed.

Figure 3:
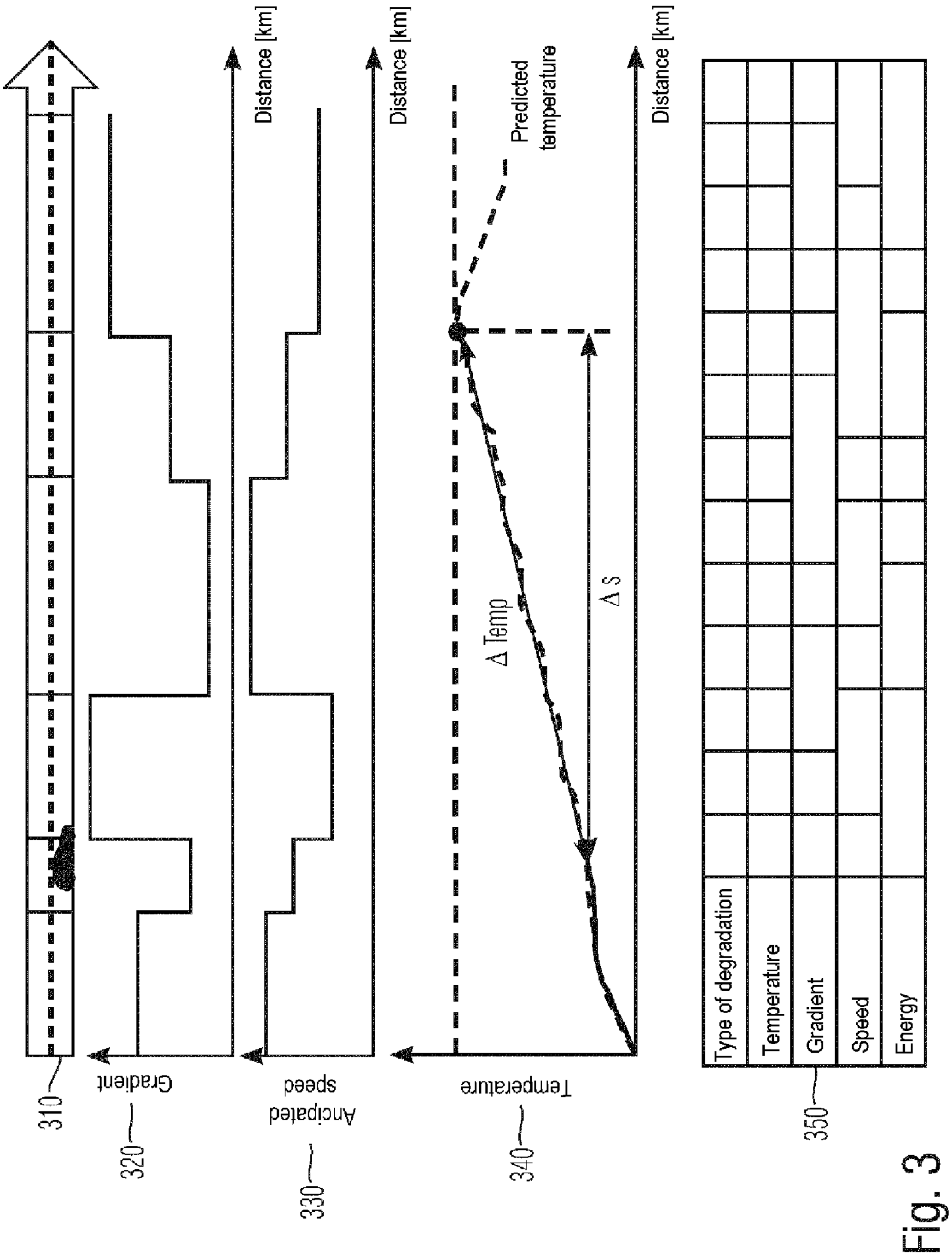
FIG. 3 shows an exemplary continuous prediction of the type of degradation of an electrical drive component by the prediction unit.

FIG. 3 shows an exemplary continuous prediction of a type of degradation of an electrical drive component 112 A, 112 B, . . . 112 N by the prediction unit 130. The planned route 310 is categorized by the prediction unit 130 with reference to the gradient 320, by way of an exemplary road attribute, and the temperature of an electrical drive component 112 A, 112 B, . . . 112 N. Consideration of an anticipated speed of the vehicle, which can be determined, for example, from a driver profile of the user of the vehicle 110 and/or from an average value for a vehicle fleet completing the route, is executed by means of an appropriate computing unit. The route 310 is divided by the prediction unit 130 into sections for each road attribute, i.e., in the present example, into sections per gradient 320 and into sections per anticipated speed 330. The prediction unit 130 can now execute, for each road attribute, a prediction of a type of degradation with respect to the temperature or temperature value 340 along the planned route 310.

Figure 4:
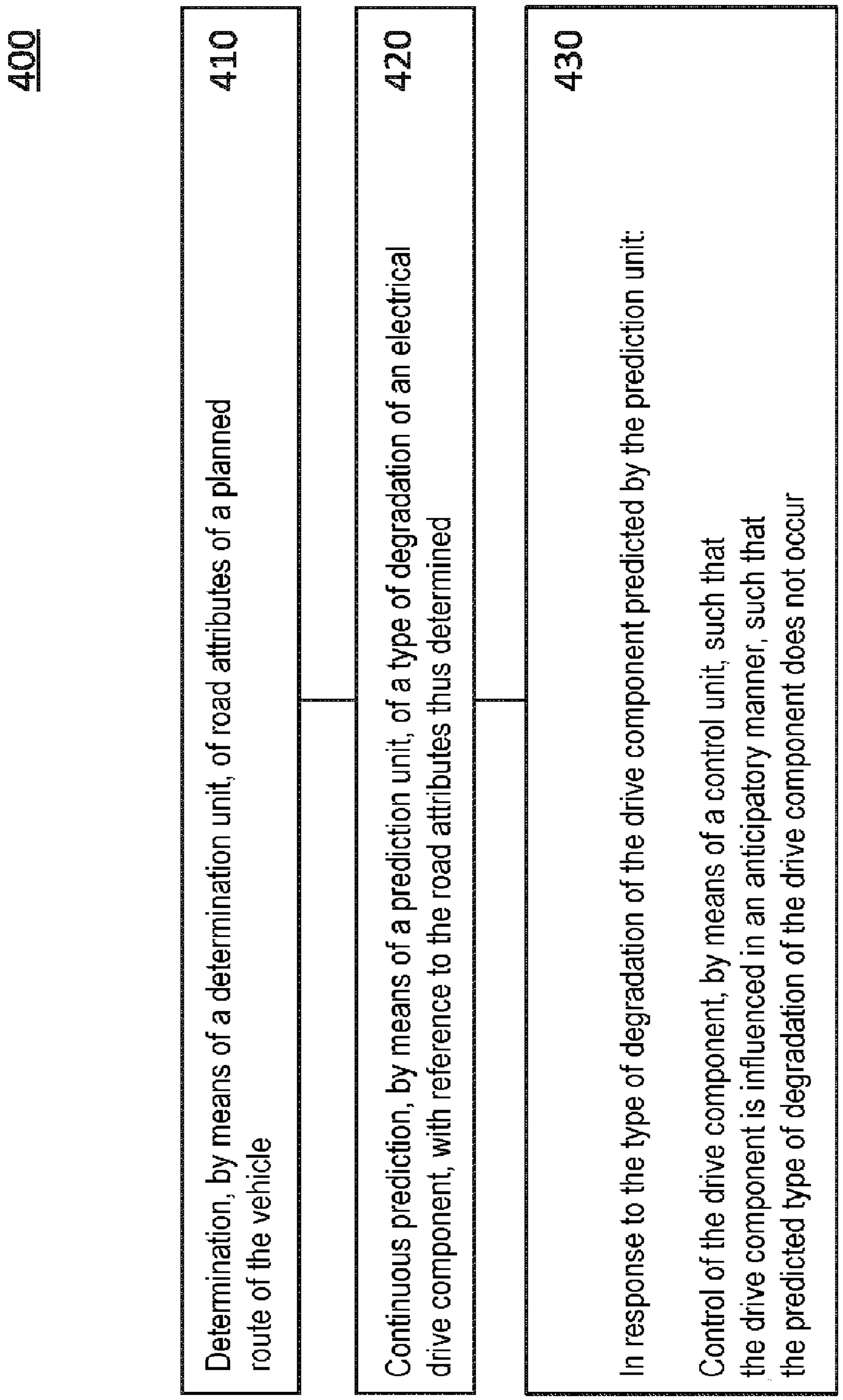
FIG. 4 shows an exemplary method for predicting and avoiding degradation of an electrical drive component in a vehicle.

FIG. 4 shows an exemplary method 400 for predicting and avoiding the degradation of an electrical drive component 112 A, 112 B, . . . 112 N in a vehicle 110, which can be executed by a system 100 as described with reference to FIGS. 1, 2 and 3.

The method 400 comprises: determination 410, by means of a determination unit 120, of road attributes of a planned route of the vehicle 110; continuous prediction 420, by means of a prediction unit 130, of a type of degradation of an electrical drive component 112 A, 112 B, . . . 112 N, with reference to the road attributes thus determined; and in response to the type of degradation of the drive component 112 A, 112 B, . . . 112 N predicted by the prediction unit 130: control 430 of the drive component 112 A, 112 B, . . . 112 N by a control unit, such that the drive component 112 A, 112 B, . . . 112 N is influenced in an anticipatory manner, such that the predicted type of degradation of the drive component 112 A, 112 B, . . . 112 N does not occur.

The electrical drive component 112 A, 112 B . . . 112 N can comprise the following: a high-voltage store of the vehicle 110, wherein the predicted type of degradation of the high-voltage store comprises the following: degradation associated with an overshoot or undershoot of a predefined critical temperature of the high-voltage store; and/or degradation associated with an overshoot or undershoot of predefined critical state-of-charge of the high-voltage store; and/or degradation associated with an overshoot or undershoot of a further appropriate and predefined operating status variable of the high-voltage store; and/or an electrical machine, or e-machine, of the vehicle 110, wherein the predicted type of degradation of the e-machine comprises a degradation associated with the overshoot or undershoot of a predefined critical temperature of a component of the e-machine; and/or drive electronics of the vehicle 110, wherein the predicted type of degradation of drive electronics comprises a degradation associated with the overshoot or undershoot of a predefined critical temperature of the drive electronics; and/or a high-voltage cable harness of the vehicle 110, wherein the predicted type of degradation of the high-voltage cable harness comprises a degradation associated with the overshoot or undershoot of a predefined critical temperature of the high-voltage cable harness; and/or a further electrical drive component of the vehicle 110, wherein the predicted type of degradation of the further electrical drive component comprises a degradation associated with the overshoot or undershoot of an appropriate and predefined critical operating status variable of the latter.

Continuous prediction 420 of a type of degradation by the prediction unit 130 can comprise the following: categorization of the planned route by reference to road attributes, wherein road attributes comprise: a rising gradient along the route, an anticipated speed of the vehicle along the route, a road type, a road surface, applicable speed limits along the route, a curvature of the route, and/or current impairments along the route; division of the route into sections for each road attribute; and prediction of a degradation of the electrical drive component 112 A, 112 B, . . . 112 N of the vehicle 110 for each road attribute.

Continuous prediction 420 of the type of degradation of the electrical drive component 112 A, 112 B . . . 112 N by the prediction unit 130 can be executed in consideration of a current driving style of a driver of the vehicle 110.

The invention claimed is:

1. A system for predicting and avoiding degradation of an electrical drive component in a vehicle, the system comprising:

a determination unit configured to determine road attributes of a planned route of the vehicle;

a prediction unit configured to continuously predict a type of degradation of an electrical drive component in the vehicle with respect to the determined road attributes; and a control unit configured to, in response to the prediction unit predicting the type of degradation of the drive component, anticipatorily control the drive component such that the predicted type of degradation of the drive component does not occur.

2. The system according to claim 1, wherein the electrical drive component comprises at least one of:

a high-voltage store of the vehicle, wherein the predicted type of degradation of the high-voltage store comprises: degradation associated with an overshoot or undershoot of a predefined critical temperature of the high-voltage store; degradation associated with an overshoot or undershoot of predefined critical state-of-charge of the high-voltage store; and/or degradation associated with an overshoot or undershoot of a further appropriate and predefined operating status variable of the high-voltage store;

an electrical machine, or e-machine, of the vehicle, wherein the predicted type of degradation of the e-machine comprises: a degradation associated with the overshoot or undershoot of a predefined critical temperature of a component of the e-machine;

drive electronics of the vehicle, wherein the predicted type of degradation of drive electronics comprises: a degradation associated with the overshoot or undershoot of a predefined critical temperature of the drive electronics;

a high-voltage cable harness of the vehicle, wherein the predicted type of degradation of the high-voltage cable harness comprises: a degradation associated with the overshoot or undershoot of a predefined critical temperature of the high-voltage cable harness; and a further electrical drive component of the vehicle, wherein the predicted type of degradation of the further electrical drive component comprises: a degradation associated with the overshoot or undershoot of an appropriate and predefined critical operating status variable of the latter.

3. The system according to claim 1, wherein the continuous prediction of a type of degradation by the prediction unit comprises at least one of:

categorization of the planned route by reference to road attributes, wherein road attributes comprise: a rising gradient along the route, an anticipated speed of the vehicle along the route, a road type, a road surface, applicable speed limits along the route, a curvature of the route, and/or current impairments along the route;

division of the route into sections for each road attribute; and prediction of a degradation of the electrical drive component of the vehicle for each road attribute.

4. The system according to claim 1, wherein continuous prediction of the type of degradation of the electrical drive component by the prediction unit is executed in consideration of a current driving style of a driver of the vehicle.

5. A method for predicting and avoiding degradation of an electrical drive component in a vehicle, the method comprising:

determining, via a determination unit, road attributes of a planned route of the vehicle;

continuously predicting, via a prediction unit, a type of degradation of an electrical drive component with reference to the determined road attributes; and in response to predicting the type of degradation of the drive component by the prediction unit:

anticipatorily control the drive component, via a control unit, such that the predicted type of degradation of the drive component does not occur.

6. The method according to claim 5, wherein the electrical drive component comprises the following:

a high-voltage store of the vehicle, wherein the predicted type of degradation of the high-voltage store comprises at least one of: degradation associated with an overshoot or undershoot of a predefined critical temperature of the high-voltage store, degradation associated with an overshoot or undershoot of predefined critical state-of-charge of the high-voltage store, degradation associated with an overshoot or undershoot of a further appropriate and predefined operating status variable of the high-voltage store;

an electrical machine, or e-machine, of the vehicle, wherein the predicted type of degradation of the e-machine comprises: a degradation associated with the overshoot or undershoot of a predefined critical temperature of a component of the e-machine;

drive electronics of the vehicle, wherein the predicted type of degradation of drive electronics comprises: a degradation associated with the overshoot or undershoot of a predefined critical temperature of the drive electronics;

a high-voltage cable harness of the vehicle, wherein the predicted type of degradation of the high-voltage cable harness comprises: a degradation associated with the overshoot or undershoot of a predefined critical temperature of the high-voltage cable harness; and/or a further electrical drive component of the vehicle, wherein the predicted type of degradation of the further electrical drive component comprises: a degradation associated with the overshoot or undershoot of an appropriate and predefined critical operating status variable of the latter.

7. The method according to claim 5, wherein continuous prediction of a type of degradation by the prediction unit comprises at least one of:

categorization of the planned route by reference to road attributes, wherein road attributes comprise: a rising gradient along the route, an anticipated speed of the vehicle along the route, a road type, a road surface, applicable speed limits along the route, a curvature of the route, and/or current impairments along the route;

division of the route into sections for each road attribute; and prediction of a degradation of the electrical drive component of the vehicle for each road attribute.

8. The method according to one of claim 5, wherein continuous prediction of the type of degradation of the electrical drive component by the prediction unit is executed in consideration of a current driving style of a driver of the vehicle.

* * * * *